United States Patent
Nishida et al.

(10) Patent No.: US 6,660,419 B1
(45) Date of Patent: Dec. 9, 2003

(54) SOLID POLYMER ELECTROLYTE FUEL CELL

(75) Inventors: Kazufumi Nishida, Moriguchi (JP); Eiichi Yasumoto, Soraku-gun (JP); Hisaaki Gyoten, Shijonawate (JP); Kazuhito Hatoh, Osaka (JP); Makoto Uchida, Hirakata (JP); Hideo Ohara, Katano (JP); Yasushi Sugawara, Higashiosaka (JP); Teruhisa Kanbara, Toyonaka (JP); Toshihiro Matsumoto, Ibaraki (JP); Junji Niikura, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/719,832

(22) PCT Filed: Jun. 28, 1999

(86) PCT No.: PCT/JP99/03464

§ 371 (c)(1),
(2), (4) Date: Dec. 18, 2000

(87) PCT Pub. No.: WO00/01025

PCT Pub. Date: Jan. 6, 2000

(30) Foreign Application Priority Data

| Jun. 30, 1998 | (JP) | 10-183757 |
| Jun. 30, 1998 | (JP) | 10-183760 |
| Sep. 21, 1998 | (JP) | 10-266221 |
| Mar. 5, 1999 | (JP) | 11-058203 |

(51) Int. Cl.$^7$ .......... H01M 8/00; H01M 8/10; H01M 6/48; H01M 10/18

(52) U.S. Cl. .............. 429/32; 429/13; 429/210

(58) Field of Search .............. 429/12, 13, 30, 429/32, 210

(56) References Cited

U.S. PATENT DOCUMENTS

| 3,880,670 A | | 4/1975 | Shinn |
| 5,034,288 A | | 7/1991 | Bossel |
| 5,300,370 A | * | 4/1994 | Washington et al. ......... 429/34 |
| 5,547,777 A | * | 8/1996 | Richards ..................... 429/210 |
| 5,578,388 A | * | 11/1996 | Faita et al. .................. 429/26 |
| 5,624,769 A | * | 4/1997 | Li et al. ...................... 429/32 |
| 5,683,828 A | * | 11/1997 | Spear et al. ............... 29/623.5 |

FOREIGN PATENT DOCUMENTS

| EP | 0 780 916 A1 | 6/1992 |
| EP | 0 955 686 A1 | 11/1999 |
| EP | 1 098 380 A1 | 5/2001 |
| JP | 57-105974 A | 7/1982 |

(List continued on next page.)

*Primary Examiner*—Randy Gulakowski
*Assistant Examiner*—Donald V Scaltrito
(74) *Attorney, Agent, or Firm*—Akin, Gump, Strauss, Hauer & Feld, L.L.P.

(57) ABSTRACT

Disclosed is a polymer electrolyte fuel cell having an improved separator plate. The fuel cell comprises a solid polymer electrolyte membrane; an anode and a cathode sandwiching the solid polymer electrolyte membrane therebetween; an anode-side conductive separator plate having a gas flow path for supplying a fuel gas to the anode; and a cathode-side conductive separator plate having a gas flow path for supplying an oxidant gas to the cathode, wherein each of the anode-side and cathode-side conductive separator plates is composed of a metal and a conductive coat which has resistance to oxidation and covers a surface of the metal. Alternatively, the above-mentioned separator plates are formed of a metal and a coat having resistance to oxidation and have roughened surfaces with recessions and protrusions, and portions of a top surface of the protruding portions, which lack the coat, are electrically connected to an electrode.

17 Claims, 7 Drawing Sheets

U.S. PATENT DOCUMENTS

| | | |
|---|---|---|
| JP | 08180883 A | 7/1996 |
| JP | 10-12246 | 1/1998 |
| JP | 10255823 A | 9/1998 |
| JP | 10334927 A | 12/1998 |
| JP | 11126621 A | 5/1999 |
| JP | 11126622 A | 5/1999 |
| KR | 93-2426 | 2/1993 |
| WO | WO 94/11912 A1 | 5/1994 |
| WO | WO 97/50138 | 12/1997 |
| WO | WO99/19927 | 4/1999 |
| WO | WO 99/67845 A1 | 12/1999 |

* cited by examiner

SOLID POLYMER ELECTROLYTE FUEL CELL

BACKGROUND OF THE INVENTION

1. Technical Field

The present invention relates to solid polymer electrolyte fuel cells used for portable power sources, electric vehicle power sources, domestic cogeneration systems, etc.

2. Background Art

A fuel cell using a solid polymer electrolyte generates electric power and heat simultaneously by electrochemically reacting a fuel gas containing hydrogen and an oxidant gas containing oxygen such as the air. This fuel cell is basically composed of a polymer electrolyte membrane for selectively transporting hydrogen ions, and a pair of electrodes, namely, an anode and a cathode, formed on both surfaces of the polymer electrolyte membrane. The above-mentioned electrode usually includes a catalyst layer which is composed mainly of carbon particles carrying a platinum metal catalyst and formed on the surface of the polymer electrolyte membrane, and a diffusion layer which has both gas permeability and electronic conductivity and is formed on the outer surface of this catalyst layer.

Moreover, a gas sealing material or gaskets are arranged on the peripheral portions of the electrodes with the polymer electrolyte membrane therebetween so as to prevent a fuel gas and an oxidant gas supplied to the electrodes from leaking out or prevent two kinds of gases from mixing together. These sealing material and gaskets are assembled into a single part together with the electrodes and polymer electrolyte membrane in advance. This part is called the "MEA" (electrolyte membrane and electrode assembly). Disposed outside of the MEA are conductive separator plates for mechanically securing the MEA and for connecting adjacent MEAs electrically in series, or in parallel in some case. A portion of the separator plate, which is in contact with the MEA, is provided with a gas flow path for supplying a reacting gas to the electrode surface and for removing a generated gas and an excess gas. Although the gas flow path can be provided separately from the separator plate, grooves are usually formed on the surface of each separator to serve as the gas flow path.

In order to supply the fuel gas and oxidant gas to such grooves, it is necessary to branch pipes for supplying the fuel gas and oxidant gas, respectively, according to the number of separator plates to be used, and to use piping jigs for connecting an end of the branch directly to the grooves of the separator plate. This jig is called "manifold", and a type of manifold which directly connects the supply pipes of the fuel gas and oxidant gas to the grooves as mentioned above is called the "external manifold". There is a type of manifold, called the "internal manifold", with a more simple structure. The internal manifold is one in which through apertures are formed in the separator plates having a gas flow path and the inlet and outlet of the gas flow path are extended to the apertures so as to supply the fuel gas and oxidant gas directly from the apertures.

Since the fuel cell generates heat during operation, it is necessary to cool the cell with cooling water or the like so as to keep the cell in good temperature conditions. In general, a cooling section for feeding the cooling water is provided for every one to three cells. There are a type in which the cooling section is inserted between the separator plates and a type in which a cooling water flow path is provided on the rear surface of the separator plate so as to serve as the cooling section, and the latter is often used. The structure of a common cell stack is such that the MEAs, separator plates and cooling sections are placed one upon another to form a stack of 10 to 200 cells, and this cell stack is sandwiched by end plates, with a current collector plate and an insulating plate between the cell stack and each end plate, and secured with a clamping bolt from both sides.

In such a solid polymer electrolyte fuel cell, the separator plates need to have a high conductivity, high gas tightness with respect to a fuel gas and oxidant gas, and high corrosion resistance against a reaction of hydrogen/oxygen oxidation-reduction. For such reasons, conventional separator plates are usually formed from carbon materials such as glassy carbon and expanded graphite, and the gas flow path is formed by cutting the surface of the separator plate, or by molding with a mold when the material is expanded graphite.

In a conventional method including cutting a carbon plate, it is difficult to reduce the cost of the material of the carbon plate and the cost of cutting the carbon plate. Besides, a method using expanded graphite requires a high cost of material, and it has been considered that the high cost of material prevents a practical use of this method.

In resent years, there have been attempts to use a metal plate such as stainless steel in place of the conventionally used carbon material.

However, in the above-mentioned method using a metal plate, since the metal plate is exposed to an acidic atmosphere of the pH of 2 to 3 at high temperatures, the corrosion or dissolution of the metal plate will occur when used in a long time. The corrosion of the metal plate increases the electrical resistance in the corroded portion and decreases the output of the cell. Moreover, when the metal plate is dissolved, the dissolved metal ions diffuse into the polymer electrolyte membrane and are trapped by the ion exchange cite of the polymer electrolyte membrane, resulting in a lowering of the ionic conductivity of the polymer electrolyte membrane. For these causes, when a cell in which a metal plate is used as it is for a separator plate is operated for a long time, a problem arises that the power generating efficiency is gradually lowered.

BRIEF SUMMARY OF THE INVENTION

An object of the present invention is to improve a separator plate for use in fuel cells and provide a separator plate which maintains chemical inactivity even when its surface to come in contact with a gas is exposed to an acidic atmosphere, suppresses corrosion and dissolution, and has good conductivity by using a metal that can readily be processed as a material.

The present invention provides a solid polymer electrolyte fuel cell comprising: a solid polymer electrolyte membrane; an anode and a cathode sandwiching the solid polymer electrolyte membrane therebetween; an anode-side conductive separator plate having a gas flow path for supplying a fuel gas to the anode; and a cathode-side conductive separator plate having a gas flow path for supplying an oxidant gas to the cathode, wherein each of the anode-side and cathode-side conductive separator plates is composed of a metal and a conductive coat which has resistance to oxidation and covers a surface of the metal.

The conductive coat is preferably selected from the group consisting of a carbonaceous coat, a conductive inorganic compound coat, and a metal-plated coat containing particles of a water repellent material.

A preferred conductive separator plate is composed of a spongy metal and a carbon powder layer which is filled into the spongy metal and covers the surface of the spongy metal.

Another preferred conductive separator plate is composed of a metal plate and a conductive coat covering the surface of the metal plate, wherein the conductive coat is a conductive inorganic compound selected from the group consisting of oxides, nitrides and carbides.

Still another preferred conductive separator plate is composed of a metal plate and a conductive coat covering the surface of the metal plate, wherein the conductive coat is made of a metal-plated coat containing particles of a water repellent material.

The present invention provides a solid polymer electrolyte fuel cell comprising anode-side and cathode-side conductive separator plates, each of which is formed by a metal whose surface is covered with a coat having resistance to oxidation, wherein at least surfaces of the separator plates which face an anode and cathode are roughened to have recessions and protrusions, and portions of the top surface of the protruding portions, which lack the coat, are electrically connected to the anode and cathode, respectively.

Moreover, the present invention provides a solid polymer electrolyte fuel cell comprising anode-side and cathode-side conductive separator plates, each of which is formed by a metal whose surface is covered with a coat having resistance to oxidation, wherein portions of the separator plates' surface facing an anode and cathode, which lack the coat, are electrically connected to the anode and cathode, respectively, through conductive particles interposed between the separator plate and the anode and between the separator plate and the cathode.

The present invention provides a conductive separator plate composed of a metal plate having grooves or ribs for guiding a fuel gas or oxidant gas on its surface facing an electrode, and an insulating sheet which forms a gas flow path for guiding the fuel gas or oxidant gas from a gas supply side to a gas discharge side on a surface of the metal plate in cooperation with the grooves or ribs and has elasticity to function as a gasket for preventing the fuel gas or oxidant gas from leaking out of the gas flow path.

DETAILED DESCRIPTION OF THE INVENTION

Figure 1:
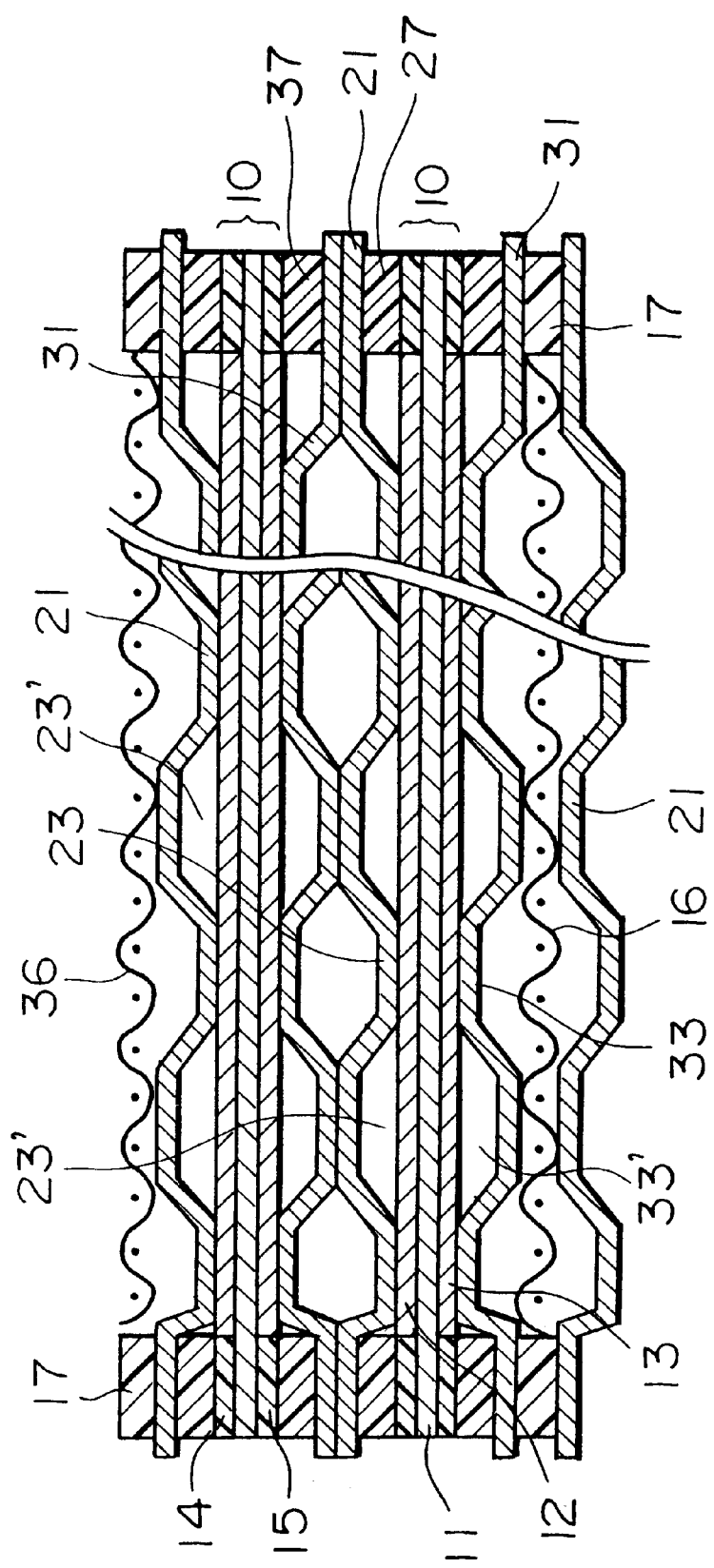
FIG. 1 is a cross sectional view depicting essential sections of a fuel cell according to an example of the present invention.

A separator plate of the present invention is basically composed of a metal plate whose surface is covered with a coat having resistance to oxidation. Besides, this metal plate is provided with ribs or grooves for forming a gas flow path by, for example, press working.

A preferred separator plate of the present invention is composed of a combination of the worked metal plate having ribs or grooves for guiding a fuel gas or oxidant gas on its surface facing an electrode and an insulating sheet which has elasticity and functions as a gasket. The insulating sheet forms a gas flow path for guiding the fuel gas or oxidant gas from a gas supply side to a gas discharge side in cooperation with the ribs or grooves of the metal plate, and functions as a gasket for preventing the fuel gas or oxidant gas from leaking out of the gas flow path.

In a preferred embodiment, the coat having resistance to oxidation which covers the surface of the metal plate is a coat having specified conductivity as described below.

In another embodiment, the coat having resistance to oxidation is a coat having poor conductivity or insulating properties. In this case, as to be described later, the separator plate is electrically connected to an anode or cathode through a portion lacking the coat.

As the above-mentioned metal, a metal plate such as stainless steel and aluminum, which has excellent conductivity and allows easy formation of ribs or grooves serving as a gas flow path by press working, etc., is used. For the conductive coat to be coated on such a metal plate, it is preferable to use a coat of a conductive inorganic compound and a metal-plated coat containing particles of a water repellent material.

As the inorganic compound forming the conductive coat, it is preferable to use oxides, such as indium-doped tin oxide $Sn(In)O_2$, lead oxides $PbO$ and $PbO_2$, nitrides, such as $TiN$ and $TiAlN$, and carbides such as $SiC$. In order to form such a conductive coat on the metal plate surface, methods, such as vacuum evaporation, electron beam evaporation, sputtering and high frequency glow discharge decomposition, are used. The thickness of such a conductive coat is preferably in the range of 500 Å to 5 $\mu$m from the viewpoint of the possession of both of corrosion resistance and conductivity.

The metal-plated coat containing particles of a water repellent material is obtained by including particles of a water repellent material in a coat plated with a corrosion-resistant metal such as gold, silver, nickel and chrome. Materials used as the water repellent material are fluorocarbon resin-based water repellent materials, such as pitch fluoride, fluorinated graphite, polytetrafluoroethylene, tetrafluoroethylene-hexafluoropropylene copolymer and tetrafluoroethylene-perfluoroalkyl vinyl ether copolymer. The metal-plated coat containing particles of a water repellent material is obtained by dispersing the particles of the water repellent material in a plating bath for obtaining the metal plating and by performing electroplating in this plating bath. The particle diameter of the particles of the water repellent material used here is in the range of 0.05 to 50 $\mu$m, preferably 0.5 to 10 $\mu$m, and the thickness of the plated coat is preferably in the range of 0.5 to 10 $\mu$m. An appropriate pH of the plating bath is in the range of 3 to 6, and an appropriate current density is in the range of 0.1 to 1 $A/cm^2$.

The conductive separator plate of the present invention can also be composed of a spongy metal and a carbon powder layer which is filled into the spongy metal and covers the surface of the spongy metal. Specifically, the carbon powder is made into a paste with water or an aqueous solution of a viscous agent such as carboxymethyl cellulose, and this paste is filled into the spongy metal. Then, the resulting spongy metal is pressed by application of pressure so as to form a separator plate having a gas flow path. In this manner, a separator plate, which is filled with the carbon powder and has a surface covered with the carbon powder layer having excellent resistance to corrosion, is fabricated.

The following description will explain the cases where the oxidation-resistant coat is a coat having poor conductivity or insulating properties, and the separator plate is electrically connected to the anode or cathode through a portion lacking the coat.

First, in the first case, the metal plate whose surface is covered with the coat having resistance to oxidation is roughened so that at least its surface facing the anode and cathode has minute recessions and protrusions. Then, the carbon fibers of a carbon paper constituting a gas diffusion layer of the anode or cathode break the coat on the top surface of the protruding portions of the roughened section by the clamping pressure of a cell stack, and the portions lacking the coat are electrically connected to the anode or cathode.

In the second case, conductive particles are interposed between the metal plate whose surface is covered with a coat having resistance to oxidation and the anode or cathode in contact with this metal plate. This conductive particles break the coat on the metal plate surface by the clamping pressure of a cell stack, and the portions lacking the coat are electrically connected to the anode or cathode. The above-mentioned conductive particles may be made contact with the metal base through the coat by mechanically burying the conductive particles in the metal plate surface in advance.

The above-mentioned coat having poor conductivity or insulating properties has appropriate resistance to corrosion and a thickness preferably in the range of 500 Å to 10 μm for electrical connection to the electrode.

Next, referring to FIG. 1 through FIG. 5, examples of the structure of a fuel cell of the present invention will be explained. The structural views used here are intended to facilitate understanding, and the relative sizes and positional relations of the respective elements are not necessarily exact.

Figure 2:
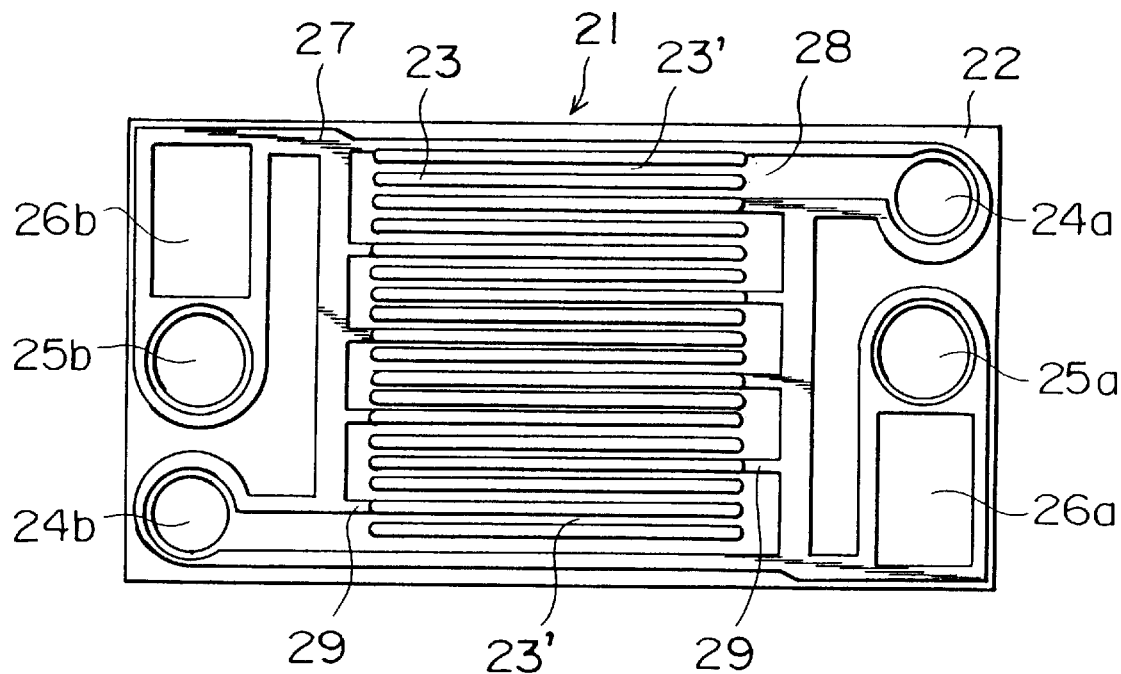
FIG. 2 is a plan view of an anode-side separator plate of the fuel cell.
Figure 3:
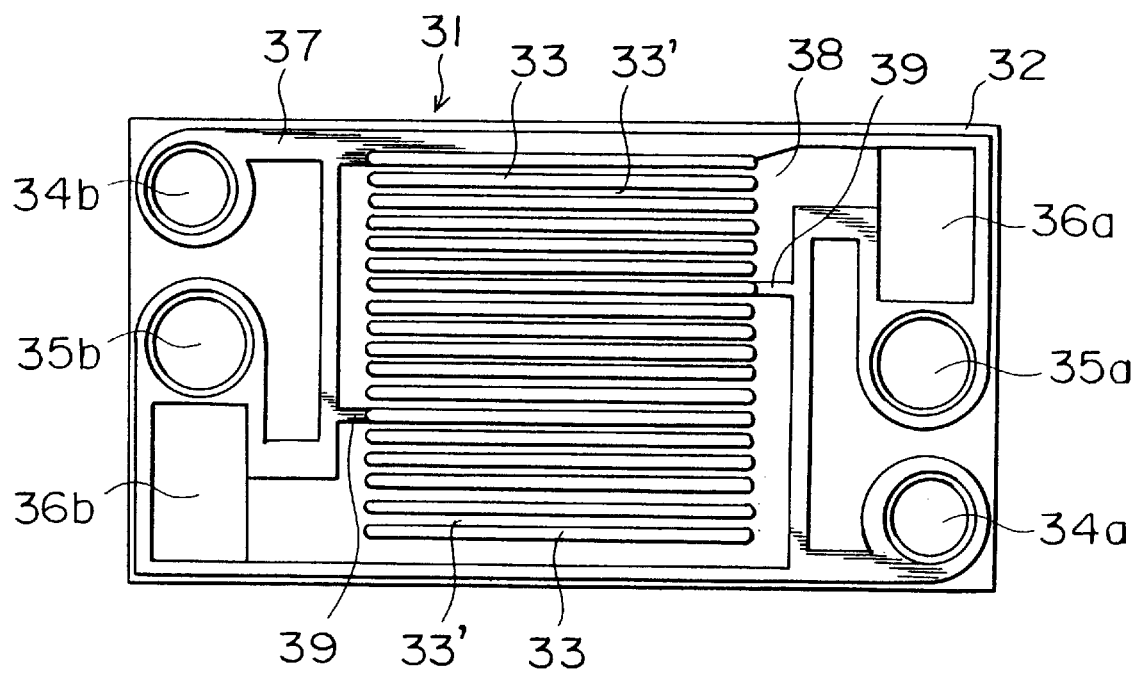
FIG. 3 is a plan view of a cathode-side separator plate of the fuel cell.

FIG. 1 is a cross sectional view depicting essential parts of a fuel cell stack, FIG. 2 is a plan view of its anode-side separator plate, and FIG. 3 is a plan view of its cathode-side separator plate.

10 represents an electrolyte membrane and electrode assembly (hereinafter referred to as the "MEA") composed of a solid electrolyte membrane 11, anode 12 and cathode 13 bonded to both surfaces of the solid electrolyte membrane 11, gaskets 14 and 15 arranged on the peripheral portions thereof, etc. An anode-side separator plate 21 and a cathode-side separator plate 31 are disposed on the outside of the MEA. The MEA 10 and the separator plates 21 and 31 constitute a unit cell, and a plurality of such unit cells are stacked so as to be connected in series. In this example, a conductive metal mesh 16 and a gasket 17 are inserted between the separator plates 21 and 31 of every two cells so as to form a cooling section for passing cooling water.

Figure 4:
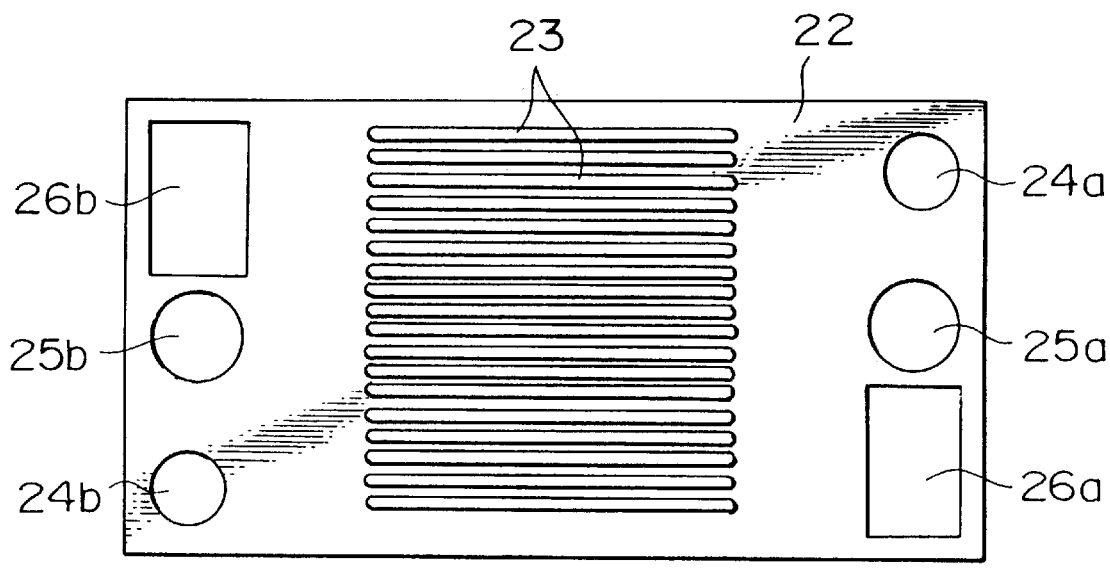
FIG. 4 is a plan view of a metal plate constituting the anode-side separator plate.
Figure 5:
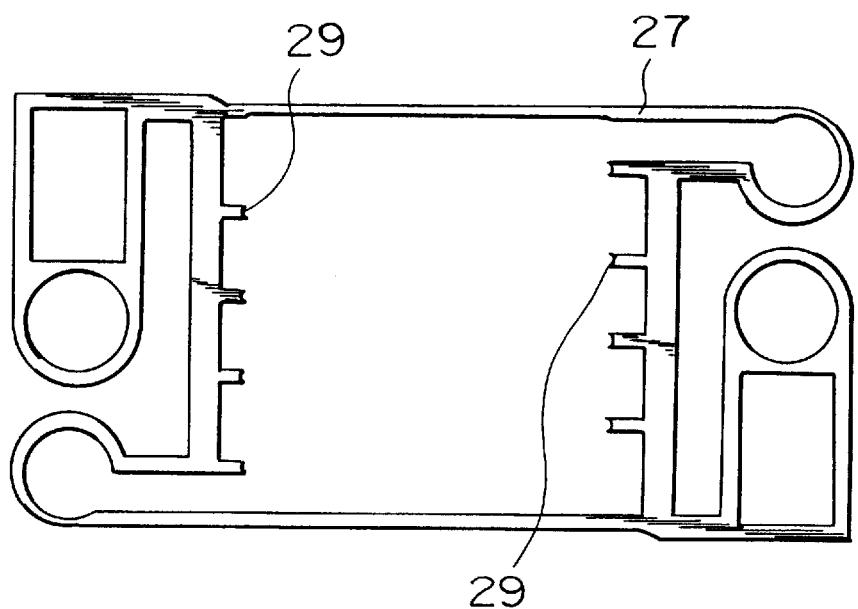
FIG. 5 is a plan view of an insulating sheet constituting the anode-side separator plate.

The anode-side separator plate 21 is constructed by sticking a metal plate 22 shown in FIG. 4 and an insulating sheet 27 shown in FIG. 5 together. The metal plate 22 is provided with an array of protruding ribs 23 formed at the center of one major surface facing the anode by press working, and fluid inlet openings 24a, 25a, 26a and fluid outlet openings 24b, 25b, 26b on the right and left. Meanwhile, the insulating sheet 27 is fabricated by stamping a sheet, and it forms a groove 28 for guiding a fluid, i.e., a fuel gas from the fluid inlet opening 24a to the fluid outlet opening 24b when stuck to a surface of the metal plate 22 having the ribs 23 and functions as a gasket for preventing the fuel gas from leaking out of the groove 28 and for preventing the fluid passing through the openings 25a, 25b and openings 26a, 26b from leaking out when attached to the anode.

The groove 28 formed on the surface of the separator plate 21 causes two grooves 23' formed on both sides of the rib 23 by the assemblage of the ribs 23 of the metal plate 22 and rib pieces 29 of the sheet 27 to pass a fuel gas.

As shown in FIG. 3, the cathode-side separator plate 31 is composed of a metal plate 32 provided with an array of protruding ribs 33 formed at the center of one major surface facing the cathode by press working and fluid inlet openings 34a, 35a, 36a and fluid outlet openings 34b, 35b, 36b on the right and left; and an insulating sheet 37 stuck to the surface of the metal plate having the ribs 33. Formed on the surface of this cathode-side separator plate 31 facing the cathode is a groove 38 for guiding a fluid, i.e., an oxidant gas from the fluid inlet opening 36a to the fluid outlet opening 36b. Besides, the sheet 37 functions as a gasket for preventing the oxidant gas from leaking out of the groove 38 and for preventing the fluid passing through the openings 34a, 35a and openings 34b, 35b from leaking out.

The groove 38 causes four grooves 33' formed between the ribs 33 by the assemblage of the ribs 33 of the metal plate 32 and rib pieces 39 of the sheet 37 to pass the oxidant gas.

Thus, when a separator plate is constructed by a combination of the metal plate having a plurality of ribs formed by press working and the insulating sheet obtained by stamping, it is possible to change the size of the fluid passage groove by only changing the shape of the insulating sheet.

In the above-mentioned example, the cross-sectional area of a passage formed between the ribs 33 as a gas flow path running to the groove 38 of the cathode-side separator plate 31 is three times the cross-sectional area of a passage formed between the ribs 23 as a gas flow path running to the groove 28 of the anode-side separator plate 21. It is therefore possible to make the flow rate of the oxidant gas greater than that of the fuel gas.

In the above-mentioned example, while each of the anode-side conductive separator plate and cathode-side conductive separator plate is independently fabricated, it is possible to construct the anode-side conductive separator plate and cathode-side conductive separator plate as one piece of separator plate in which one of the surfaces is an anode-side conductive separator plate and the other surface is a cathode-side conductive separator plate.

EXAMPLE 1

An electrode catalyst carrying 25% by weight of platinum particles with an average particle diameter of about 30 angstroms on acetylene black was prepared. A dispersion of this catalyst powder in isopropanol was mixed with a dispersion of perfluorocarbon sulfonic acid powder in ethyl alcohol to form a paste. This paste was printed on one of the surfaces of a 250 μm thick carbon nonwoven fabric by screen printing so as to form an electrode catalyst layer. The amounts of platinum and perfluorocarbon sulfonic acid contained in the resultant catalyst layer were adjusted to become 0.5 mg/cm$^2$ and 1.2 mg/cm$^2$, respectively. By forming the catalyst layer on the carbon nonwoven fabric as a diffusion layer in this manner, an anode and a cathode having identical configurations were fabricated.

An electrolyte membrane and electrode assembly (MEA) was fabricated by bonding these electrodes to both surfaces of the center part of a proton conductive polymer electrolyte membrane having an area slightly larger than the electrode by hot pressing so that the catalyst layers were in contact with the electrolyte membrane. The electrolyte membrane used here was a 25 μm thick thin film of a perfluorocarbon sulfonic acid represented by the following formula, wherein x=1, y=2, m=5 to 13.5, and n≈1000. Incidentally, the perfluorocarbon sulfonic acid mixed into the catalyst layer was the same compound as the above-mentioned electrolyte membrane.

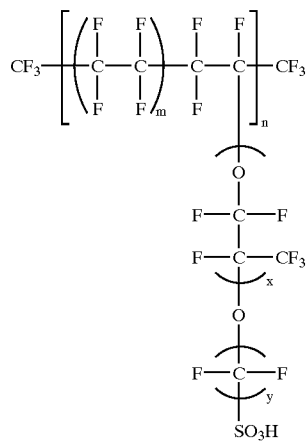

Next, a process of fabricating a conductive separator plate will be described. As shown in FIG. 3, the ribs 23 with a width of about 2.8 mm and a height of about 1 mm were formed at a pitch of 5.6 mm in a 10 cm×9 cm area at the center part of a 0.3 mm thick stainless steel SUS316 plate by press working. Subsequently, in order to remove an oxide film on the surface, pre-treatment was applied by sputtering with Ar under an atmosphere of Ar gas at $5 \times 10^{-6}$ Torr. Next, under the atmosphere of Ar gas at $5 \times 10^{-6}$ Torr, the temperature of this separator plate was raised to 300° C., and an In-doped tin oxide layer was formed in a thickness of 0.5 μm on the surface of the separator plate by electron beam evaporation. The metal plate 22 thus treated and the insulating sheet 27 shown in FIG. 4 were stuck together so as to fabricate the anode-side separator plate 21. The metal plate 32 treated in the same manner and the insulating sheet 37 were stuck together so as to fabricate the cathode-side separator plate 31.

These separator plates were combined with the above-mentioned MEAs so as to stack 50 cells, and the resultant cell stack was clamped via current collector plates and insulating plates by stainless steel end plates and clamping rods with a pressure of 20 kgf/cm². When the clamping pressure is too small, the gas leaks and the contact resistance between the conductive members increases, resulting in a lowering of the cell performance. On the other hand, when the clamping pressure is too large, the electrodes are broken and the separator plates are deformed, and thus it is important to change the clamping pressure according to the design of the groove for the gas flow path.

As a comparative example, a cell was assembled to have the same structure as that of Example 1 except that the conductive separator plates were formed by stainless steel SUS316 plates with untreated surfaces.

Polymer electrolyte fuel cells of Example 1 and the comparative example were held at 85° C., and a hydrogen gas which was humidified and heated to a dew point of 83° C. was supplied to the anode, while the air which was humidified and heated to a dew point of 78° C. was supplied to the cathode. As a result, an open circuit voltage of 50 V was exhibited in a no-load condition in which a current is not output.

Figure 6:
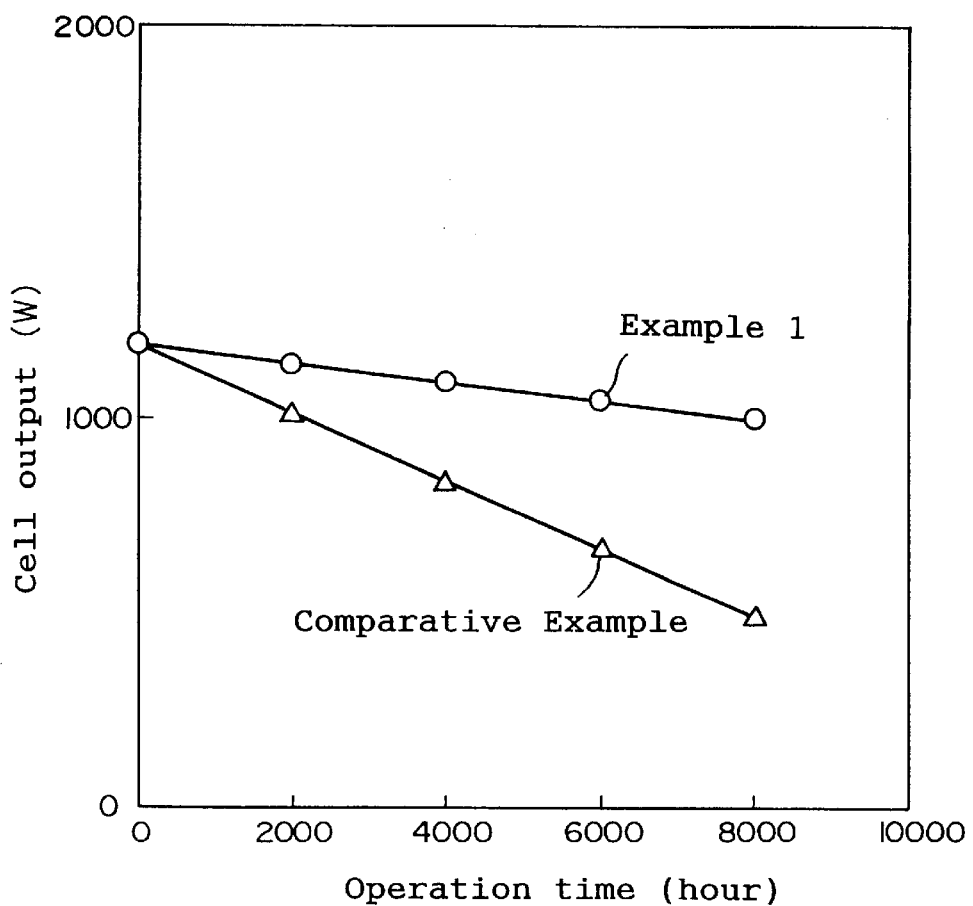
FIG. 6 is a drawing showing the output characteristics of fuel cells of Example 1 of the present invention and a comparative example.

These cells were subjected to a continuous power generation test under the conditions of a fuel utilization ratio of 80%, an oxygen utilization ratio of 40% and a current density of 0.5 A/cm², and the changes of the output characteristics with time are shown in FIG. 6. As a result, the output of the cell of the comparative example was lowered with the passage of time, while the cell of Example 1 retained the cell output of about 1000 W (22 V–45 A) over 8000 hours.

EXAMPLE 2

In this example, a cell was assembled and evaluated in the same manner as in Example 1, except for the use of separator plates having a lead oxide layer on the surface of a stainless steel plate on which Pb was deposited by vapor deposition.

A process of manufacturing a conductive separator plate will be described below. First, after applying the same pre-treatment as in Example 1 to a 0.3 mm thick stainless steel SUS316 plate, a 1 μm thick Pb layer was formed on the surface of the plate under an atmosphere of Ar (99.9999%) at $1 \times 10^{-7}$ Torr and at a temperature of 200° C. by vapor deposition. Subsequently, a 1 μm thick PbO layer was formed on the Pb-deposited surface by sputtering. The sputtering was performed under an atmosphere of Ar (99.9999%) having an oxygen partial pressure of $2 \times 10^{-4}$ Torr and at a temperature of 200° C. by controlling the sputtering power so that the film deposition rate was 3 μm/hour. The resultant sputtered layer was identified as PbO by X-ray diffraction. The specific resistance of this PbO layer was $5 \times 10^{-5}$ Ω·cm.

Moreover, a 1 μm thick $PbO_2$ layer was formed in place of PbO under an atmosphere of oxygen at $3 \times 10^{-4}$ Torr, a temperature of 40° C. and a film deposition rate of 2 μm/hour.

EXAMPLE 3

In this example, a case where a nitride was used as the conductive inorganic compound is described.

A process of manufacturing a conductive separator plate will be described below. After pressing a 0.3 mm thick Ti plate in the same manner as in the previous Example, a 1 μm thick TiN layer was formed on the surface of the plate by sputtering using RF-planar magnetron. The target used here was TiN (99%), and the sputtering was performed under an atmosphere of Ar (99.9999%) at $4 \times 10^{-2}$ Torr and at a temperature of 500° C. by controlling the sputtering power to 400 W so that the deposition rate was 1.5 μm/hour. The resultant sputtered layer was identified as TiN by X-ray diffraction. The specific resistance of this TiN layer was $2 \times 10^{-4}$ Ω·cm.

Incidentally, when the film thickness of TiN is reduced, there is a merit that the impedance as a cell was lowered and the output characteristic is improved accordingly, but there is also a demerit that the long-term stability is impaired. Besides, when the film thickness is made too thick, the reliability is increased, but it takes a longer time to deposit a film, causing a problem that the productivity is lowered. It was found by examining the thickness of the TiN layer that a thickness of about 1 μm was practical.

Next, after pressing a 0.3 mm thick Al plate in the same manner as above, a 1.2 μm thick TiAlN layer was formed on the surface of the plate by sputtering using RF-diode. The target used here was TiAlN (99%), and the sputtering was performed under an atmosphere of Ar (99.9999%) at $4 \times 10^{-2}$ Torr and at a temperature of 300° C. by controlling the sputtering power to 300 W so that the deposition rate was 1.0 μm/hour. The specific resistance of the TiAlN layer fabricated by this method was $1 \times 10^{-3}$ Ω·cm.

EXAMPLE 4

In this example, a case where an n-type SiC, that is, a conductive carbide was used as the conductive inorganic compound is described.

A separator plate was fabricated by forming a P-doped n-type SiC layer on a stainless steel SUS316 plate to which the same press working and pre-treatment as in Example 1 were applied. Specifically, the n-type SiC layer was formed in a thickness of 1000 angstroms on the surface of the stainless steel plate by 14.56 MHz high-frequency glow discharge decomposition, under an atmosphere of mixed silane, methane ($CH_4$) and diborane ($PH_3$) diluted with hydrogen in a ratio of P/(Si+C)=10 atom % at 10 Torr and at a temperature of 300° C. After the deposition, a gold electrode was vapor-deposited on the SiC layer, and the specific resistance of the SiC layer was measured 50 Ω·cm.

Cells using the separator plates of Examples 2 to 4 above were subjected to the continuous power generation test under the same conditions as in Example 1, and the initial cell output (10 hours after the start of operation) and the cell output after 8000 hours operation were compared. The results are shown in Table 1.

TABLE 1

| Cell | Conductive coat | Output (W) Initial | About 8000 hours later |
|---|---|---|---|
| Example 1 | $Sn(In)O_2$ | 1200 | 1000 |
| Example 2 | PbO | 1150 | 950 |
|  | $PbO_2$ | 1100 | 980 |
| Example 3 | TiN | 1220 | 1100 |
|  | Ti—Al—N | 1180 | 1050 |
| Example 4 | (P)SiC | 1050 | 980 |

EXAMPLE 5

A nickel-plated coat containing pitch fluoride particles as a water repellent material was formed on the surface of a stainless steel plate SUS316L to which the same press working and pre-treatment as in Example 1 were applied, under the following conditions.

| Plating Bath | |
|---|---|
| Nickel sulphamate | 150 g/l |
| Nickel chloride | 50 g/l |
| Boric acid | 50 g/l |
| Cationic surface active agent Tertiary-perfluoroammonium $\{C_8F_{17}SO_2NH(CH_2)_3N^+(CH_3)_3 \cdot Cl^-\}$ | 15 g/l |
| Fine particles of pitch fluoride | 20 g/l |
| pH | 4.2 |
| Bath temperature | 45 ± 5° C. |
| Anode | Nickel plate |
| Current density | 0.5 A/cm$^2$ |

The pitch fluoride used here was prepared by finely grinding pitch fluoride with an average molecular weight of 2000 and a F/C atomic ratio=1.3 into particles with an average particle diameter of 1.3 μm. The resultant nickel-plated coat had a thickness of 7 μm and Ni:pitch fluoride (weight ratio)=85:15.

This cell was subjected to the continuous power generation test under the same conditions as in Example 1. As a result, the output characteristic was almost the same as the cell of Example 1, and the cell output of 1000 W (22 V–45 A) was retained over 8000 hours.

As the thickness of the nickel-plated coat containing the pitch fluoride particles is increased, the initial output is lowered, but the long-term reliability is improved. Moreover, as the ratio of the pitch fluoride is increased, the initial characteristic is lowered, but the long-term reliability is improved.

Next, a separator plate was fabricated by changing the pH of the above-mentioned plating bath and the current density during electrolysis, and a cell was assembled in the same manner. Incidentally, the pH of the plating bath was controlled by the amount of boric acid.

Table 2 shows the initial output and the output after about 8000 hours operation of the respective cells.

TABLE 2

| | Current Density | Cell Output (W) | |
|---|---|---|---|
| PH | (A/cm$^2$) | Initial | After 8000 hours |
| 4.2 | 0.05 | 1150 | 1100 |
| 4.2 | 0.1 | 1180 | 1050 |
| 4.2 | 0.5 | 1200 | 1000 |
| 4.2 | 1.0 | 1220 | 950 |
| 4.2 | 1.1 | 1250 | 700 |
| 4.2 | 2.0 | 1260 | 500 |
| 1 | 0.5 | 1200 | 100 |
| 2.5 | 0.5 | 1200 | 500 |
| 3 | 0.5 | 1200 | 900 |
| 6.5 | 0.05 | 1200 | 1100 |

It is appreciated from Table 2 that the higher the current density during electrolysis, the more deterioration is caused by the long-time use. However, when the current density is small, an enormous processing time is required, and the practicability is impaired. Besides, when the pH of the plating bath is smaller than 3, the deterioration is increased by the long-time use. However, if the pH is made too close to neutral, the current density during electrolysis cannot be increased and an enormous processing time is required, impairing the practicability.

According to these results, it is appropriate to adjust the pH of the plating bath within the range of 3 to 6 and the current density per area of a surface to be plated during electrolysis within the range of 0.1 A/cm$^2$ to 1 A/cm$^2$.

EXAMPLE 6

A conductive separator plate was fabricated by forming a 7 μm thick nickel-plated layer containing fluorinated graphite particles with the use of fluorinated graphite particles having an average particle diameter of 3 μm instead of pitch fluoride. A cell similar to that of Example 1 was constructed by using this separator plate, and subjected to the continuous power generation test under the same conditions as in Example 1. As a result, this cell retained the cell output of 1089 W (24.2 V–45 A) over 8000 hours.

EXAMPLE 7

In this example, plated coats were respectively formed on the stainless steel plates SUS316L by changing the plating metal and water repellent material, and separator plates were fabricated. The output characteristics of cells using these separator plates are shown in Table 3.

TABLE 3

| Metal | Water repellent material | Cell Output (W) Initial | Cell Output (W) After 8000 hours |
|---|---|---|---|
| Nickel | PTFE | 1150 | 980 |
| Nickel | TFE-HFP | 1130 | 960 |
| Nickel | TFE-PFEV | 1120 | 940 |
| Gold | Pitch fluoride | 1200 | 1100 |
| Silver | Pitch fluoride | 1200 | 1020 |
| Chrome | Pitch fluoride | 1200 | 1050 |
| Chrome | Fluorinated graphite | 1250 | 1060 |

In Table 3, PTFE represents polytetrafluoroethylene (the polymerization degree is about 1100), TFE-HFP represents tetrafluoroethylene-hexafluoropropylene copolymer (the polymerization degree is about 1000 and the copolymerization ratio is 1:1), and TFE-PFEV represents tetrafluoroethylene-perfluoroethyl vinyl ether copolymer (the polymerization degree is about 1000 and the copolymerization ratio is 1:1). The average particle diameter of the particles of these water repellent materials is 1 $\mu$m. The pitch fluoride and fluorinated graphite are the same as those used in the above.

The plating baths used here were prepared by adding the tertiary-perfluoroammonium $\{C_8F_{17}SO_2NH(CH_2)_3N^+(CH_3)_3.Cl^-\}$ as a cationic surface active agent and the particles of the respective water repellent materials in a ratio of 15 g/l and 50 g/l, respectively, to the compositions shown below, and electrolytic plating was performed with the pH of 5, the bath temperature of 55±5° C. and the electrolytic current of 0.2 A/cm$^2$ until the film thickness became 1 $\mu$m. The ratio by weight of the metal and water-repellent material in the resultant plated coating was 95:5.

| Gold Plating Bath | |
|---|---|
| Potassium dicyanoaurate | 10 g/l |
| Potassium cyanide | 30 g/l |
| Potassium carbonate | 30 g/l |
| Silver Plating Bath | |
| Silver cyanide | 5 g/l |
| Potassium cyanide | 20 g/l |
| Chrome plating Bath | |
| Chromic acid anhydride | 250 g/l |
| Sulfuric acid | 2.5 g/l |

It is apparent from these results that similar characteristics are obtainable by using any of gold, silver and chrome as well as nickel as a metal that forms the plated coat and by using any of polytetrafluoroethylene, tetrafluoroethylene-hexafluoropropyrene copolymer and tetrafluoroethylene-perfluoroethyl vinyl ether copolymer as well as pitch fluoride and fluorinated graphite as a water repellent material. Moreover, with the use of a tetrafluoroethylene-perfluoromethyl vinyl ether copolymer (the polymerization degree is about 1000 and the copolymerization ratio is 1:1) or tetrafluoroethylene-perfluoropropyl vinyl ether copolymer (the polymerization degree is about 1000 and the copolymerization ratio is 1:1) having a similar structure to the tetrafluoroethylene-perfluoroethyl vinyl ether copolymer, similar characteristics were obtained.

Further, it was confirmed that, as the thickness of the plated coat and the ratio of the water repellent material were respectively increased, the initial output was lowered, but the long-term reliability was improved.

EXAMPLE 8

In this example, a case where a separator plate using a spongy metal as a metal substrate is explained.

First, a spongy nickel substrate in strip form, with a METSUKE of about 600 g/m$^2$ and a number of three-dimensionally communicating pores having a substantially spindle shape with the ratio of the longer diameter to the shorter diameter of a grid line segment substantially parallel to the sheet surface of about 1.3, was prepared. Meanwhile, carbon black and polytetrafluoroethylene were mixed in the ratio of 3:7 by weight, and this mixture was suspended in an aqueous solution of carboxymethyl cellulose which is ten times greater in quantity so as to prepare a conductive paste. This paste was filled into the spongy nickel substrate and dried. Subsequently, the spongy nickel substrate was rolled to a thickness of 0.3 mm by rollers. A section undulated at a pitch of 5.6 mm (the groove width of about 2.8 mm) was formed in a 10 cm×9 cm area at the center part of this rolled spongy nickel substrate by press working. At this time, the height of the ribs was about 1 mm. The spongy nickel substrate was provided with manifold apertures for respectively supplying and discharging the fuel gas, cooling water and air, and was combined with an insulating plate similar to that of Example 1 so as to fabricate the anode-side and cathode-side separator plates.

A fuel cell similar to that of Example 1 was constructed by using the above-mentioned separator plates and subjected to the continuous power generation test under the same conditions as in Example 1, and consequently the cell retained the cell output of about 1000 W (22 V–45 A) over about 8000 hours.

EXAMPLE 9

With the use of separator plates fabricated from metal plates whose surface was embossed with a variety of fine patterns by roller pressing, the effect of the roughening treatment was examined. While an aluminum separator plate was easily embossed, it was difficult to form large recessions and protrusions for a stainless steel separator plate, and therefore recessions and protrusions were formed by cutting if the height of the protruding portions was more than 100 $\mu$m. Meanwhile, the protruding portions with a height of less than 10 $\mu$m were formed by polishing with sandpaper, or by adjusting the coarseness of sand particles in sand blasting. The roughened surface conditions were observed and confirmed with an optical stereoscopic microscope, electron microscope or tracer method.

Prior to testing cells after incorporating the separator plates into the cells, the contact electrical resistance between the carbon paper used as the gas diffusion layer of the electrode and metal test piece was measured with a pressure for pressing the test piece and carbon paper against each other as a parameter. Table 4 shows the average value of the contact resistance when the test piece made from stainless steel SUS316 and the carbon paper were made in contact with each other by application of a pressure of 25 kgf/cm$^2$.

TABLE 4

| Metal | Height of Protruding Portions ($\mu$m) | Contact Resistance (m$\Omega \cdot$cm$^2$) |
|---|---|---|
| SUS316 | Without roughening treatment | 180 |
| SUS316 | 5 | 20 |
| SUS316 | 10 | 25 |
| SUS316 | 20 | 30 |
| SUS316 | 50 | 55 |
| SUS316 | 100 | 65 |
| SUS316 | 200 | 70 |
| SUS316 | 300 | 75 |
| SUS316 | 500 | 80 |

It is appreciated from Table 4 that the SUS316 plate has a large contact resistance of 120 m$\Omega \cdot$cm$^2$ when its surface is not roughened, but has an improved contact resistance of 10 to 50 m$\Omega \cdot$cm$^2$ when its surface is roughened. Regarding aluminum, after the aluminum was roughened, an alumite treatment was performed by anodic oxidation. The aluminum plate has a high contact resistance of 530 m$\Omega \cdot$cm$^2$ if it is not roughened, but has a contact resistance of 50 to 300 m$\Omega \cdot$cm$^2$ if it is roughened. In the case of the aluminum plate, excessive anodic oxidation causes an increase in the thickness of the alumite coating layer, and thus a significant improvement in the contact resistance was not exhibited even when the aluminum plate was roughened. It is appreciated from the above results that the contact resistance tends to be smaller with a decrease of the height of the protruding portions and that the contact resistance is remarkably improved by roughening.

Next, in order to pursue the relationship between the configuration of recessions and protrusions formed on the surface of the separator plate and the contact resistance, the contact resistance was measured with the use of separator plates on which recessions and protrusions were formed by changing the press die and press pressure in emboss press molding. As a result, the contact resistance was not improved much when the press pressure was small and flat portions remained largely on the top of the protruding portions. Moreover, in general, the protruding portion has a wedge-like shape with a thin point, and it was found that the contact resistance is smaller as the angle of the wedge-like shape becomes smaller. Thus, it was found that the pressure for pressing the plate against the carbon paper or the like can be reduced for the same contact resistance. This effect was remarkable when the angle of the wedge shape was smaller than 90 degrees.

Figure 7:
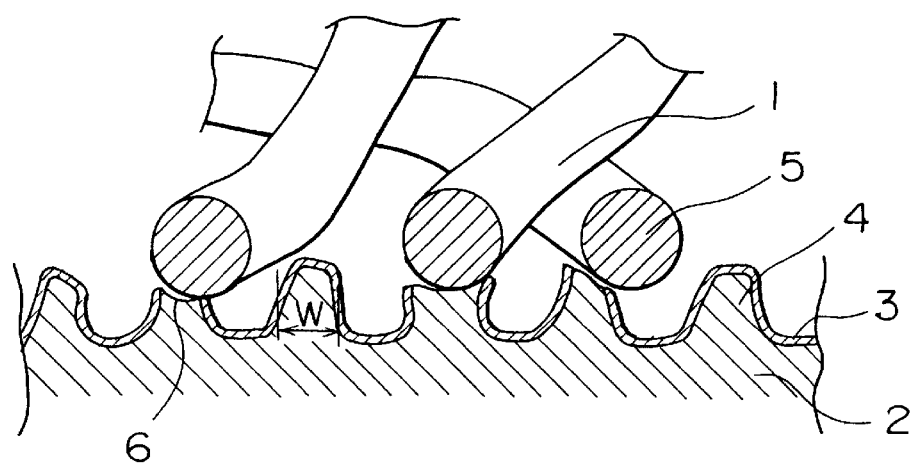
FIG. 7 is a depiction showing an electrical contact section between a separator plate and an electrode according to another example of the present invention.

Further, since it was found that there was a large difference in the behavior of the contact resistance between metal plates which have substantially the same protruding portions on the roughened surface when observed by the tracer method, the causes were pursued. The fine structure of the contact section between the separator plate and electrode was depicted in FIG. 7 based on the observation with a microscope. Carbon fibers 1 constituting the gas diffusion layer of the electrode were pressed against a stainless steel separator plate 2 and a conductive path is formed through an oxide coat 3 on the surface. When the width W of a protruding portion 4 is narrow, it achieves a greater improvement in the contact resistance in comparison with a protruding portion 4 with a wider width W. When the width of the protruding portion 4 was narrower than 20 $\mu$m, the contact resistance was remarkably decreased. As shown in FIG. 7, when the width of the protruding portion 4 is substantially equal to the diameter (5 to 20 $\mu$m) of the carbon fiber 1 of the carbon paper, the deformation of the protruding portion caused by the pressure for pressing the carbon fiber 1 and separator plate 2 against each other increases, and the area of a substantial contact area 6 between the carbon material and metal material becomes larger.

Ribs for forming a gas flow path were formed by pressing a metal plate roughened as mentioned above and combined with an insulating sheet similar to that of Example 1 so as to fabricate separator plates. These separator plates and the MEA similar to that of Example 1 were combined to assemble a unit cell, and the power generation test was performed. The cell test was carried out as follows. First, the air and hydrogen were humidified by putting the air into a hot water bubbler at 60 to 70° C. and hydrogen into a hot water bubbler at 80° C., and then supplied to the manifold running to the electrodes. The test was carried out by arranging the cell temperature to be 75° C. and the gas utilization ratio indicating the ratio of the gas consumed by the electrode reaction to be 70% for hydrogen and 20% for the air. The cell performance was evaluated by the output voltage when the load current density was 0.5 A/cm$^2$.

Figure 8:
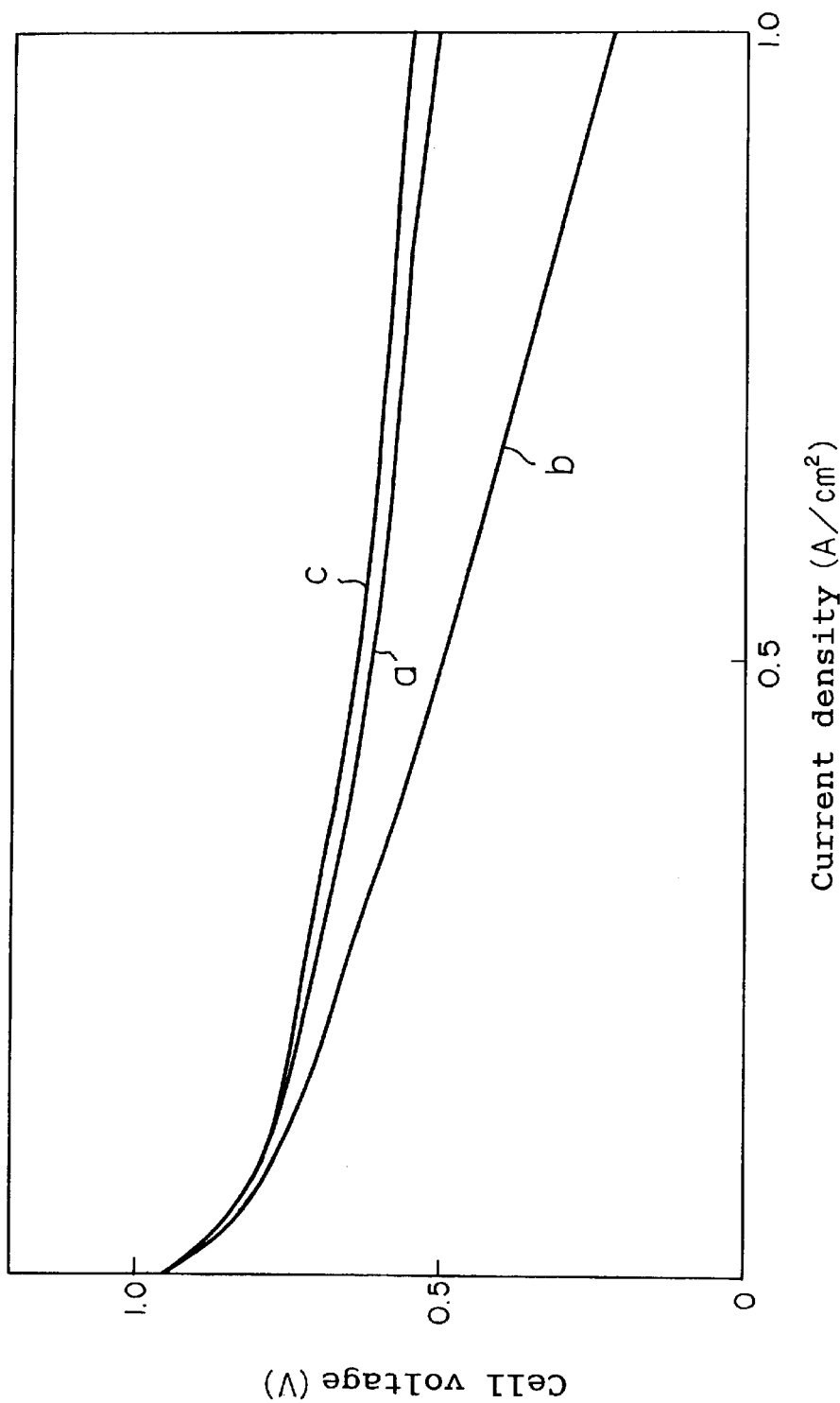
FIG. 8 is a drawing showing the current-voltage characteristics of fuel cells of Example 9 of the present invention and a comparative example.

FIG. 8 shows the performance of Cell "a" using a stainless steel separator plate having the protruding portions whose average height and width were respectively about 20 $\mu$m, Cell "b" using a stainless steel separator plate which was not roughened, and Cell "c" using a separator plate in which grooves for the gas flow path were formed by cutting a conventional carbon plate. It was found from the results that, if the stainless steel separator plate is roughened, it can exhibit performance as good as that of the separator plate formed by cutting the carbon plate. Moreover, the cell test was carried out for various roughened metal separator plates as shown in Table 4, and consequently a correlation that the smaller the contact resistance, the higher the cell performance was obtained. The cell performance of a cell using aluminum separator plates was low in comparison with a cell using stainless steel because of the larger contact resistance, but it was found that the cell performance can be improved by roughening the surface.

Next, the cell performance was evaluated while increasing the height of the protruding portions given by the roughening treatment. Stainless steel separator plates having the protruding portions with a height of 100 $\mu$m, 200 $\mu$m, 300 $\mu$m and 500 $\mu$m, respectively, were experimentally manufactured by press molding or cutting. While cells using any of the separator plates exhibited good performance, some of cells using separator plates having the protruding portions whose height was not less than 300 $\mu$m suffered destruction of carbon paper and showed a sudden lowering of the performance during the test. It is therefore possible to say that an appropriate height of the protruding portions is not more than 50% of the thickness of the gas diffusion layer of the electrode.

Furthermore, the correlation between the corrosion resistance and contact resistance of a roughened metal separator plate was examined. There were prepared some separator plates made from alloys containing iron such as stainless steel as a main component and having corrosion resistance by a passive state coat made from chrome oxide on the surface. By mainly changing the percentage content of chrome, a pH range in which the passive state coating was present in a stable manner was varied. It was found as a result of the cell tests that the cell performance of cells using separator plates made from alloys capable of maintaining a high corrosion resistance even in an atmosphere where the pH was lower than 2 was not very high even when the separator plates were roughened. On the other hand, with the use of separator plates having an alloy composition in which the passive state coat can not be present in a stable manner if the pH in the atmosphere is not higher than 2, the cell performance was significantly improved by applying the roughening treatment. It is considered that such a significant improvement was achieved because the effect of the roughening treatment is enhanced as the corrosion-resistant coat on the surface is thinner to a certain extent.

EXAMPLE 10

This example will explain a case where conductive particles whose hardness is higher than that of a metal forming a metal separator plate are interposed between the gas diffusion layer of the electrode and the separator plate.

Like Example 9, the contact resistance between the carbon paper and the metal test piece was evaluated prior to the cell test. Aluminum powder, stainless steel (SUS316) powder and cobalt powder were selected as metal conductive particles, crystalline graphite and glassy carbon were selected as carbon conductive particles, and titanium nitride, silicon carbide and lead oxide were selected as ceramic type conductive particles. After finely grinding each of these powders in an agate mortar for one hour, the resultant powder was made into a slurry with an organic solvent, applied to the surface of the test piece, and dried to solidify.

With the use of the carbon paper and stainless steel (SUS316) test piece, the contact resistance was measured in a state in which they were being pressed against each other by a pressure of 25 kgf/cm$^2$. The average value of the measured resistance is shown in Table 5.

TABLE 5

| Powder Material | Contact Resistance (m Ω · cm$^2$) |
| --- | --- |
| Without powder | 130–180 |
| Aluminum | 60 |
| SUS316 | 40 |
| Cobalt | 30 |
| Crystalline graphite | 80 |
| Glassy carbon | 15 |
| Titanium nitride | 20 |
| SiC | 70 |
| Lead oxide | 200 |

Every powder except the aluminum powder and lead oxide powder showed an improvement in the contact resistance. In particular, the stainless steel powder, cobalt powder, glassy carbon and titanium nitride exhibited a significantly improved contact resistance of 15 to 40 mΩ·cm$^2$ as compared with the contact resistance of 130 mΩ·cm$^2$ when such a powder was not used.

In order to determine the cause of the improvement in the contact resistance, after the test, the surface of the stainless steel test piece was observed with a microscope. As a result, in the case where the glassy carbon or titanium nitride powder was used, innumerable scratches on the stainless steel surface were observed. On the other hand, in the case where the aluminum powder or lead oxide powder was used, such scratches were not found. It is considered from these results that conductive fine particles are present on the contact surface in such a state that the particles break the coat on the surface of the stainless steel and ensure electrical conductivity between the carbon fibers constituting the carbon paper and the stainless steel test piece.

In the case where a crystalline graphite powder which was a carbon conductive particle but had a hardness smaller than the Vickers hardness (180 to 220 HV) of stainless steel was used, the improvement in the contact resistance was small. Moreover, since carbides have high Vickers hardness, when a carbide having higher conductivity than a silicon carbide used in the experiment was used, the contact resistance was significantly improved. Furthermore, with the use of the aluminum and lead oxide powders, the contact resistance was not improved because the hardness of the aluminum and lead oxide powders was lower than that of stainless steel and the conductivity of the oxide coat on the surface and their own conductivity were low.

Next, the cell tests were carried out using the glassy carbon powder and stainless steel powder among these conductive powders with high hardness. The basic structure of the cell, such as the electrolyte membrane and electrodes, the manufacturing and assembling procedure were substantially the same as those of Example 9. The glassy carbon powder whose Vickers hardness was 550 HV was obtained by grinding a block of glassy carbon powder prepared by heating a thermosetting resin over a long time, with a ball mill. The average particle diameter of this carbon powder was 30 μm. Besides, SUS304 powder having the average particle diameter of 30 μm was used as the stainless steel powder. During the assembly of a fuel cell, the glassy carbon powder which was made into a slurry with ethanol was applied to the stainless steel (SUS316) separator plate's surface in contact with the electrode, and dried. The pressure for pressing the separator plate and electrode against each other was adjusted to 25 kgf/cm$^2$.

Figure 9:
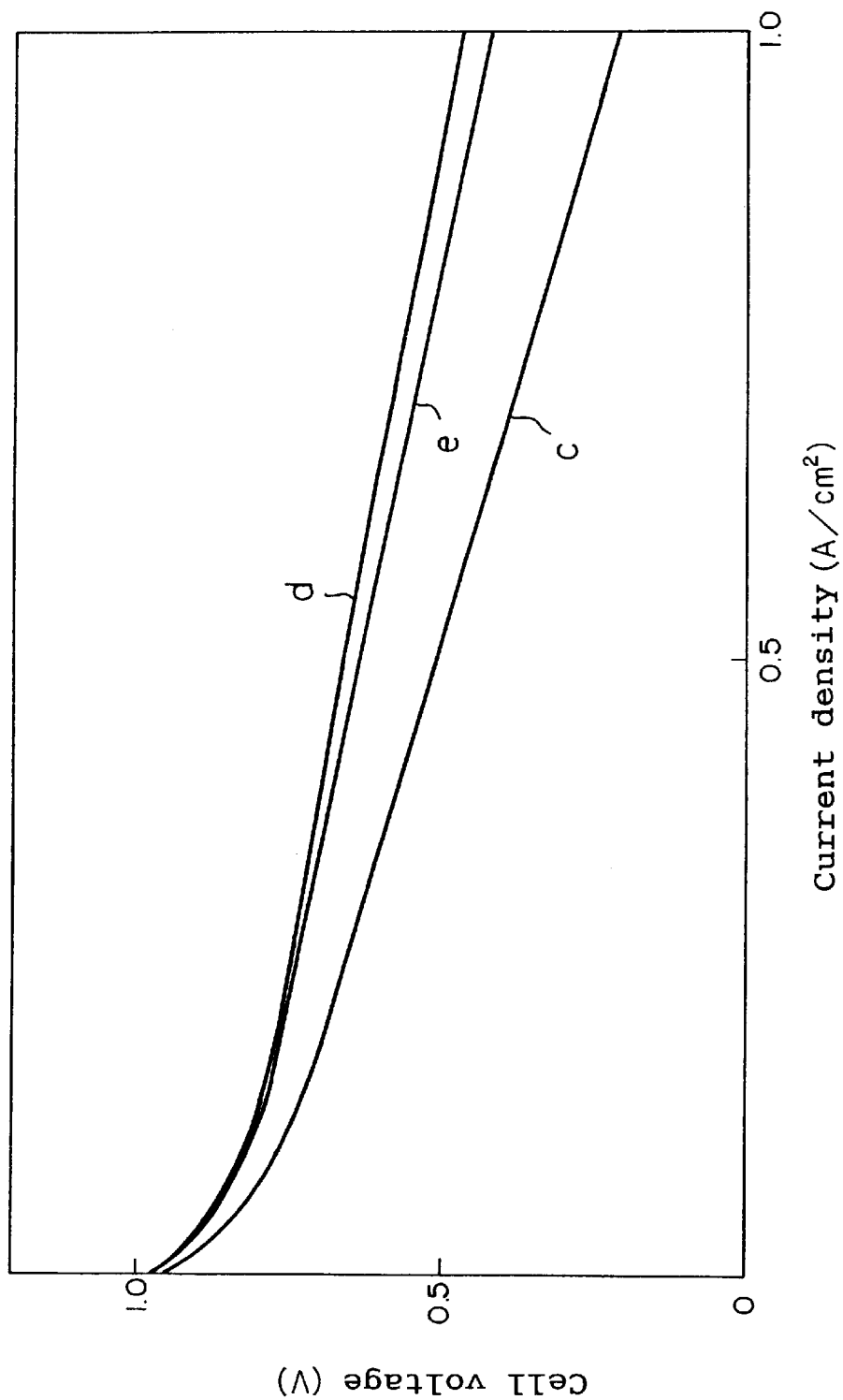
FIG. 9 is a drawing showing the current-voltage characteristics of fuel cells of Example 10 of the present invention and a comparative example.

The cell test was carried out under the same conditions as in Example 9. FIG. 9 shows the performance of Cell "d" using a separator plate on which the glassy carbon powder was applied, Cell "e" using a separator plate on which the stainless steel powder was applied, and Cell "c" of the comparative example used in Example 9. It will be appreciated that Cells "d" and "e" yielded a significantly improved output voltage of 0.63 to 0.65 V at the current density of 0.5 A/cm$^2$ as compared with the value of 0.50 V of the cell of the comparative example. Moreover, with a cell using a separator plate on which crystalline carbon was applied, a slight improvement of the output voltage to 0.57 V was confirmed.

Figure 10:
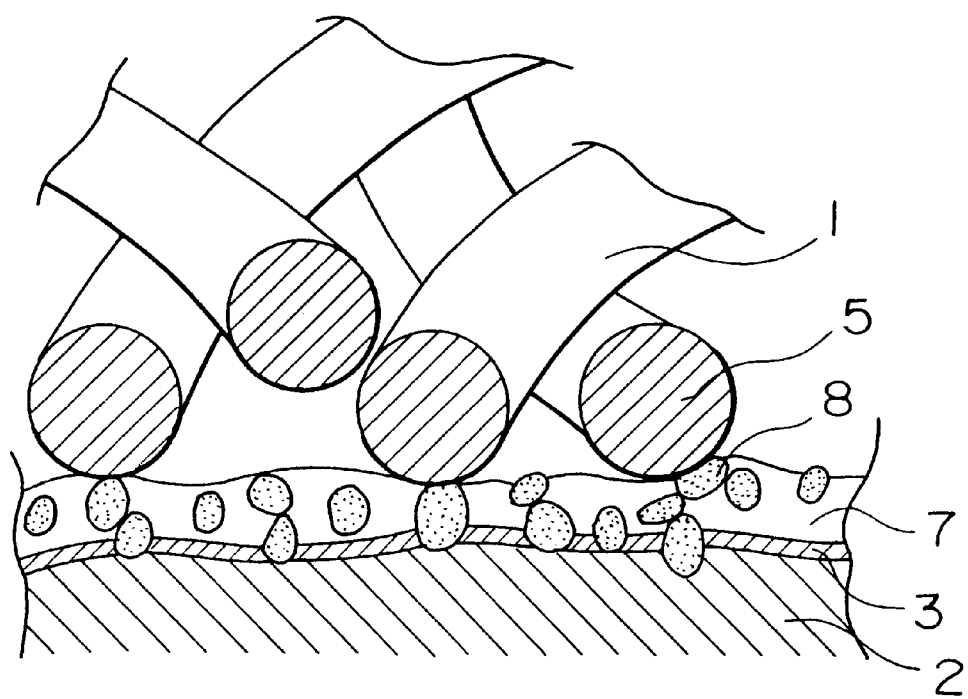
FIG. 10 is a depiction showing an electrical contact section between a separator plate and an electrode according to still another example of the present invention.

In a cell in which the glassy carbon powder is coated on the stainless steel separator plate, glassy carbon particles 8, which are fixed to an organic binder 7, pierce an oxide coat layer 3 and reach a metal base 2 while making contact with the carbon fibers 1 of the gas diffusion layer of the electrode, at the contact surface with the electrode, as schematically shown in FIG. 10. Since the conductive paths are formed by this glassy carbon particles 8, the contact resistance is significantly improved.

As described above, it is appreciated that the cell performance is improved as the value of the contact resistance becomes smaller. In this example, while the SUS304 powder which is as hard as or slightly softer than SUS316, that is the material of the separator plate, was used as the stainless steel powder, the cell performance is further improved by using a harder stainless steel material or metal powder.

Next, powders having a variety of average particle diameters (5 μm, 10 μm, 20 μm, 35 μm and 60 μm) were prepared by changing the conditions of grinding the glassy carbon to be applied to the separator plate, and the relationship between the particle diameter and the cell performance was examined. All of the cells showed an improvement in the performance at the early stage of operation, but the performance of a cell using a powder with a particle diameter greater than 20 μm tended to lower gradually during the cell test over 200 hours. It is considered that such a lowering of the performance is caused because the carbon particles are hard to be retained on the contact surface when the diameter of the carbon particles is larger than the diameter (5 to 20 μm) of the carbon fiber as a porous carbon material of the electrode.

In the above example, the carbon particles were made into a slurry with the organic solvent and then applied to the surface of the metal separator plate, but the adhesive strength of the carbon particles was week and sometimes the carbon particles dropped during the assembly of a cell. Therefore, the glassy carbon powder was dispersed in an ethanol solution of 2% by weight of polyvinyl butyral to form a slurry, and the slurry was coated on the separator plate and dried. Moreover, in order to increase the conductivity of the coated film, a slurry was prepared by adding 5 to 50% by weight of crystalline carbon powder to the glassy carbon powder and adding a surface active agent to impart dispersiveness, and then applied to the separator plate and dried. A cell using the separator plate thus obtained was tested. As a result, when polyvinyl butyral was merely added to the slurry of the glassy carbon powder, the performance was slightly lowered. However, when the conductivity of the coated film was increased by further adding the crystalline carbon, the performance was improved. It was possible to prevent the carbon powder from being dropped during the assembly by adding a binder. Moreover, it was found that, when a crystalline carbon powder or the like is added to improve the conductivity of the coated film, if around 5% by weight of conductive particles having high hardness is contained, it produces the effect of improving the contact resistance.

Furthermore, it was found, as a result of performing the cell test using a stainless steel separator plate roughened by sand blasting so as to strengthen the adhesiveness of the coated film and increase the contact area, that the cell performance was apparently improved in comparison with a cell using a separator plate which was not sand-blasted. The reason for this is considered that polyvinyl butyral shrunk during the evaporation of ethanol and solidification and the force pressing the glassy carbon particles against the surface of the stainless steel was increased.

As another method of forming conductive particles with high hardness on the contact surface, the following method was examined. Specifically, after dispersing the powder of glassy carbon on the metal surface, it was mechanically pushed into the metal plate by roller pressing. It was confirmed by observing the surface with a microscope that a number of carbon particles are buried in the metal surface. A press pressure of 50 kg-force/cm$^2$ was sufficient for soft metals such as aluminum, but a press pressure of not less than 100 kg-force/cm$^2$ was required for stainless steel. Further, it was confirmed by an experiment in which relatively coerce glassy carbon particles of around 200 μm were caused to strike the metal surface by the pressure air that broken pieces of the glassy carbon partly remained on the metal surface.

Besides, around 10 wt % of the glassy carbon ground to a particle diameter of around 10 to 100 μm was mixed into melted aluminum and dispersed. The mixture was cooled down while applying ultrasonic vibration so as to prevent segregation when solidified, and a composite block of the glassy carbon powder and aluminum was obtained. A metal test piece to be used for measuring the contact electrical resistance was cut out, and soaked in hydrochloric acid for 1 to 5 minutes. Thereafter, the alumite treatment was applied to the surface by anodic oxidation to impart a corrosion resistance, and then the contact resistance was measured. The contact resistance was sufficiently small ranging from 10 to 30 mΩ·cm$^2$. It was found by observing the surface with a microscope that a number of glassy carbon particles pieced an alumina film formed by the anodic oxidation and appeared on the surface. It was possible to obtain metals with small contact resistance and high corrosion resistance by using metals other than aluminum, for example, stainless steel, by the same method.

A cell test was carried out using a stainless steel separator plate with such glassy carbon particles mechanically buried in its surface in contact with the electrode, and consequently good cell characteristics were exhibited like a cell using a separator plate on which the glassy carbon particles that were made into a slurry with an adhesive agent was coated.

In the above example, while the fine particles of glassy carbon were used as the conductive particles with high hardness, needless to say, it is similarly effective to use other conductive particles with high hardness. Besides, the conductive particles with high hardness are particularly effective for metals having resistance to corrosion because of a film with low conductivity, such as a passive state film of metal oxide and alumina film.

In each of Examples 9 and 10, a unit cell was tested, but when a cell stack is to be tested, a cooling water section is formed for every two to three cells so as to collect the generated Joule heat and to keep a certain temperature of the cell stack. In this case, it is necessary to control the electrical resistance at the contact section between the metal separator plates. Then, the contact resistance between the separator plates can be lowered by roughening the surface of the metal separator plates and providing conductive particles having higher hardness than the separator plates on the surface of the metal separator plates.

INDUSTRIAL APPLICABILITY

According to the present invention, for the separator plate, since a metal material such as stainless steel can be used without cutting, instead of a conventional method of cutting a carbon plate, a significant reduction in the cost can be achieved for mass production. Moreover, since the separator plate can be made thinner, it contributes to the realization of a compact cell stack.

We claim:

1. A solid polymer electrolyte fuel cell comprising:

a solid polymer electrolyte membrane;

an anode and a cathode sandwiching said solid polymer electrolyte membrane therebetween;

an anode-side conductive separator plate having a gas flow path for supplying a fuel gas to said anode; and a cathode-side conductive separator plate having a gas flow path for supplying an oxidant gas to said cathode, wherein said anode-side and cathode-side conductive separator plates are formed of a metal whose surface is covered with a coat having resistance to oxidation, at least surfaces in contact with the anode and cathode are roughened to have recessions and protrusions, and portions of a top surface of protruding portions, which lack said coat, are electrically connected to the anode and cathode, respectively.

2. A solid polymer electrolyte fuel cell comprising:

a solid polymer electrolyte membrane;

an anode and a cathode sandwiching said solid polymer electrolyte membrane therebetween;

an anode-side conductive separator plate having a gas flow path for supplying a fuel gas to said anode; and a cathode-side conductive separator plate having a gas flow path for supplying an oxidant gas to said cathode, wherein said anode-side and cathode-side conductive separator plates are formed of a metal whose surface is covered with a coat having resistance to oxidation and whose surfaces facing the anode and the cathode have portions which lack said coat and are electrically connected to the anode and the cathode, respectively, through conductive particles interposed between said separator plate and the anode and between said separator plate and the cathode.

3. The solid polymer electrolyte fuel cell as set forth in claim 2, wherein said conductive particles are formed from a material whose hardness is higher than that of the metal constituting said conductive separator plates.

4. The solid polymer electrolyte fuel cell as set forth in claim 3, wherein a surface of each of said anode and cathode that faces said conductive separator plate is made of a porous layer containing-carbon particles or carbon fibers, and a particle diameter of said conductive particles is smaller than a particle diameter of said carbon particles or a diameter of said carbon fibers.

5. The solid polymer electrolyte fuel cell as set forth in claim 3, wherein said conductive particles are coated on a surface of each of said separator plates or a surface of each of said anode and cathode.

6. The solid polymer electrolyte fuel cell as set forth in claim 1, wherein said anode-side conductive separator plate is composed of a metal plate having grooves or ribs for guiding the fuel gas on its surface facing said anode, and an insulating sheet which forms a gas flow path for guiding the fuel gas from a gas supply side to a gas discharge side on a surface of said metal plate in cooperation with said grooves or ribs and which has elasticity to function as a gasket for preventing the fuel gas from leaking out of said gas flow path; and said cathode-side conductive separator plate is composed of a metal plate having grooves or ribs for guiding the oxidant gas on its surface facing said cathode, and an insulating sheet which forms a gas flow path for guiding the oxidant gas from a gas supply side to a gas discharge side on a surface of said metal plate in cooperation with said grooves or ribs and which has elasticity to function as a gasket for preventing the oxidant gas from leaking out of said gas flow path.

7. The solid polymer electrolyte fuel cell as set forth in claim 2, wherein said anode-side conductive separator plate is composed of a metal plate having proves or ribs for guiding the fuel gas on its surface facing said anode and an insulating sheet which forms a gas flow path for guiding the fuel gas from a gas supply side to a gas discharge side on a surface of said metal plate in cooperation with said grooves or ribs and which has elasticity to function as a gasket for preventing the fuel gas from leaking out of said gas flow path; and said cathode-side conductive separator plate is composed of a metal plate having grooves or ribs for guiding the oxidant gas on its surface facing said cathode and a insulating sheet which forms a gas flow path for guiding the oxidant gas from a gas supply side to a gas discharge side on a surface of said metal plate in cooperation with said grooves or ribs and which has elasticity to function as a gasket for preventing the oxidant gas from leaking out of said gas flow path.

8. A solid polymer electrolyte fuel cell comprising:

a solid polymer electrolyte membrane;

an anode and a cathode sandwiching said solid polymer electrolyte membrane therebetween;

an anode-side conductive separator plate having a gas flow path for supplying a fuel gas to said anode; and a cathode-side conductive separator plate having a gas flow path for supplying an oxidant gas to said cathode, wherein each of said anode-side and cathode-side conductive separator plates is composed of a spongy metal and a carbon powder layer which is filled into said spongy metal and coated on a surface of said spongy metal.

9. The solid polymer electrolyte fuel cell as set forth in claim 8, wherein the spongy metal comprises a spongy nickel.

10. A solid polymer electrolyte fuel cell comprising:

a solid polymer electrolyte membrane;

an anode and a cathode sandwiching said solid polymer electrolyte membrane therebetween;

an anode-side conductive separator plate having a gas flow path for supplying a fuel gas to said anode; and a cathode-side conductive separator plate having a gas flow path for supplying an oxidant gas to said cathode, wherein each of said anode-side and cathode-side conductive separator plates is composed of a metal and a conductive coat which has resistance to oxidation and covers a surface of the metal, wherein said conductive coat is selected from the group consisting of a carbonaceous coat, a metal-plated coat containing particles of a water repellent material, and a conductive inorganic compound coat wherein the conductive inorganic compound is selected from the group consisting of $Sn(In)O_2$, $PbO$, $PbO_2$, and inorganic carbides.

11. The solid polymer electrolyte fuel cell as set forth in claim 10, wherein said conductive coat is a metal-plated coat containing particles of a water repellent material, and the water repellent material is selected from the group consisting of pitch fluoride, fluorinated graphite, polytetrafluoroethylene, tetrafluoroethylene-hexafluoropropylene copolymer, and tetrafluoroethylene-perfluoroalkyl vinyl ether copolymer.

12. The solid polymer electrolyte fuel cell as set forth in claim 10, wherein said conductive coat is a metal-plated coat containing particles of a water repellent material, and the metal of said metal-plated coat comprises a metal selected from the group consisting of gold, silver, nickel, and chrome.

13. The solid polymer electrolyte fuel cell as set forth in claim 10, wherein the particle diameter of the particles of water repellent material is in a range of 0.05 to 50 $\mu$m.

14. The solid polymer electrolyte fuel cell as set forth in claim 10, wherein the metal-plated coat containing particles of water repellent material has a thickness in a range of 0.5 to 10 $\mu$m.

15. The solid polymer electrolyte fuel cell as set forth in claim 10,
  wherein said anode-side and cathode-side conductive separator plates are formed as a one piece separator plate, wherein a first surface of said one piece separator plate forms the anode-side conductive separator plate and a second surface of said one piece separator plate forms the cathode-side conductive separator plate.

16. The solid polymer electrolyte fuel cell as set forth in claim 10,
  wherein said anode-side conductive separator plate is composed of a metal plate having grooves or ribs for guiding the fuel gas on its surface facing said anode and an insulating sheet which forms a gas flow path for guiding the fuel gas from a gas supply side to a gas discharge side on a surface of said metal plate in cooperation with said grooves or ribs and which has elasticity to function as a gasket for preventing the fuel gas from leaking out of said gas flow path; and
  wherein said cathode-side conductive separator plate is composed of a metal plate having grooves or ribs for guiding the oxidant gas on its surface facing said cathode and an insulating sheet which forms a gas flow path for guiding the oxidant gas from a gas supply side to a gas discharge side on a surface of said metal plate in cooperation with said grooves or ribs and which has elasticity to function as a gasket for preventing the oxidant gas from leaking out of said gas flow path.

17. The solid polymer electrolyte fuel cell as set forth in claim 10,
  wherein the metal of said separator plates is selected from the group consisting of aluminum, stainless steel and nickel.

\* \* \* \* \*